(12) United States Patent
You

(10) Patent No.: US 8,909,537 B2
(45) Date of Patent: Dec. 9, 2014

(54) DEVICE CAPABLE OF PLAYING MUSIC AND METHOD FOR CONTROLLING MUSIC PLAYING IN ELECTRONIC DEVICE

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 320 days.

(21) Appl. No.: 13/457,561

(22) Filed: Apr. 27, 2012

(65) Prior Publication Data

US 2013/0238341 A1    Sep. 12, 2013

(30) Foreign Application Priority Data

Mar. 6, 2012    (CN) .......................... 2012 1 0056442

(51) Int. Cl.
*G10L 25/48*    (2013.01)
(52) U.S. Cl.
USPC ........................................... 704/275

(58) Field of Classification Search
USPC ........................................................ 704/275
See application file for complete search history.

(56) References Cited

U.S. PATENT DOCUMENTS 7,297,859 B2 * 11/2007 Ueki et al. ...................... 84/613
7,465,866 B2 * 12/2008 Ueki et al. ...................... 84/613
8,060,227 B2 * 11/2011 Stefik ............................. 700/94
8,315,400 B2 * 11/2012 Goldstein et al. ............... 381/57

* cited by examiner

*Primary Examiner* — Susan McFadden
(74) *Attorney, Agent, or Firm* — Novak Druce Connolly Bove + Quigg LLP

(57) ABSTRACT

An electronic device includes a music play module that plays music and a voice recorder that records ambient voice around the electronic device. The electronic device further includes a music control module that identifies voice characteristics of the ambient voice, and controls the music play module to pause the playing of the music when the voice characteristics of the ambient voice match pre-configured voice reference information.

13 Claims, 2 Drawing Sheets

DEVICE CAPABLE OF PLAYING MUSIC AND METHOD FOR CONTROLLING MUSIC PLAYING IN ELECTRONIC DEVICE

BACKGROUND

1. Technical Field

The present disclosure relates to music play back technology, and more particular, to an electronic device capable of playing music and a method for controlling music playing in an electronic device.

2. Description of Related Art

Portable electronic devices, such as MP3 players, mobile phones, and personal digital assistants, often are configured for playing music. The portable electronic device has an audio output interface for outputting audio signals, and a user may use a headphone or an earphone connected to the audio output interface to listen to the music played by the portable electronic device.

When a person needs to talk to the user wearing the headphones or earphones, the user may be unaware of the person talking because the music is being played too loud for the user to hear the person's voice. This can be inconvenient for the user of the electronic device.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will now be made to the drawings to describe certain exemplary embodiments of the present disclosure in detail.

In general, the word "module" and "unit", as used herein, refers to logic embodied in hardware or firmware, or to a recording of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

Figure 1:
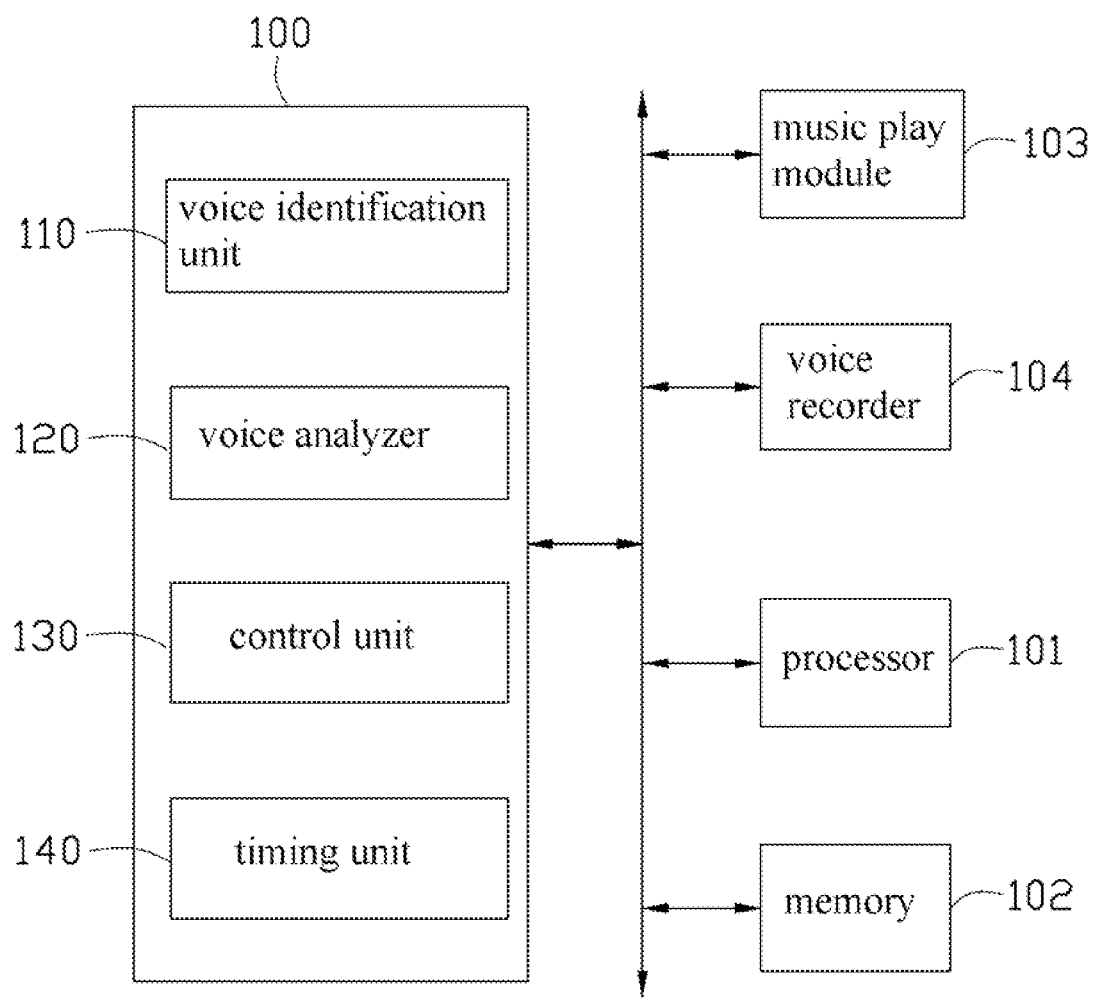
FIG. 1 schematically illustrates an electronic device capable of playing music according to an embodiment of the present disclosure.

FIG. 1 is a schematic block diagram of an electronic device 10 capable of playing music according to an embodiment of the present disclosure. The electronic device 10 may be an MP3 player, a mobile phone, a personal digital assistant or a laptop computer, and includes a processor 101, a memory 102 (e.g., flash memory), a music play module 103, a voice recorder 104, and a music control module 100.

The music play module 103 plays music. The voice recorder 104 (e.g., a microphone) records ambient sound, such as ambient voices (e.g., human dialogue) around the electronic device 10. The music control module 100 may be a software program pre-stored in the memory 102 and can be invoked and implemented by the processor 101. Alternatively, the music control module 100 may also be configured within the processor 101. The memory 102 can be a non-transitory storage medium, such as flash memory.

In one embodiment, the music control module 100 may include a voice identification unit 110, a voice analyzer 120, a control unit 130, and a timing unit 140. The voice identification unit 110 identifies the ambient voice recorded by the voice recorder 104 and obtains voice characteristics of the ambient voice. The voice characteristics may include ambient voice content information (i.e., meaning of the ambient voice), and/or, an ambient voice spectrum. The ambient voice content information, in one example, can use speech processing and noise reduction software.

The voice analyzer 120 determines whether the voice characteristics of the ambient voice match pre-configured voice reference information. The determination compares the voice characteristics with the pre-configured voice reference information, and correspondingly output a positive or negative notification to the control unit 130. In one embodiment, the positive notification can be a binary code "1", and the negative notification can be a binary code "0". For example, the voice reference information may include voice information of preset keywords such as user's name or nickname, and/or a voice spectrum of the user. If the voice analyzer 120 determines that the ambient voice content information matches the voice reference of a preset keyword, or the ambient voice spectrum matches the voice spectrum of the user, the voice analyzer 120 may issue the positive notification to the control unit 130, otherwise, issue the negative notification. In an alternative embodiment, the voice analyzer 120 may issue the positive notification only if both of the ambient voice content information and the ambient voice spectrum match the pre-configured voice reference information. The pre-configured voice information may be stored in a storage device, such as the memory 102 of the electronic device 10.

The control unit 130 controls the music play module 103 to pause the playing of the music when the control unit 130 receives the positive notification from the voice analyzer 120, and controls the music play module 103 to maintain the playing of the music when the control unit 130 receives the negative notification from the voice analyzer 120.

The timing unit 140 starts timing from when no positive notification is issued from the voice analyzer 120 after the music play module 103 pauses the music. If the value of the timing exceeds a predetermine time period (e.g., 30 seconds or 1 minute), the timing unit 140 provides a time-out signal to the control unit 130. Upon receiving the time-out signal, the control unit 130 controls the music play module 130 to resume playing the music.

Figure 2:
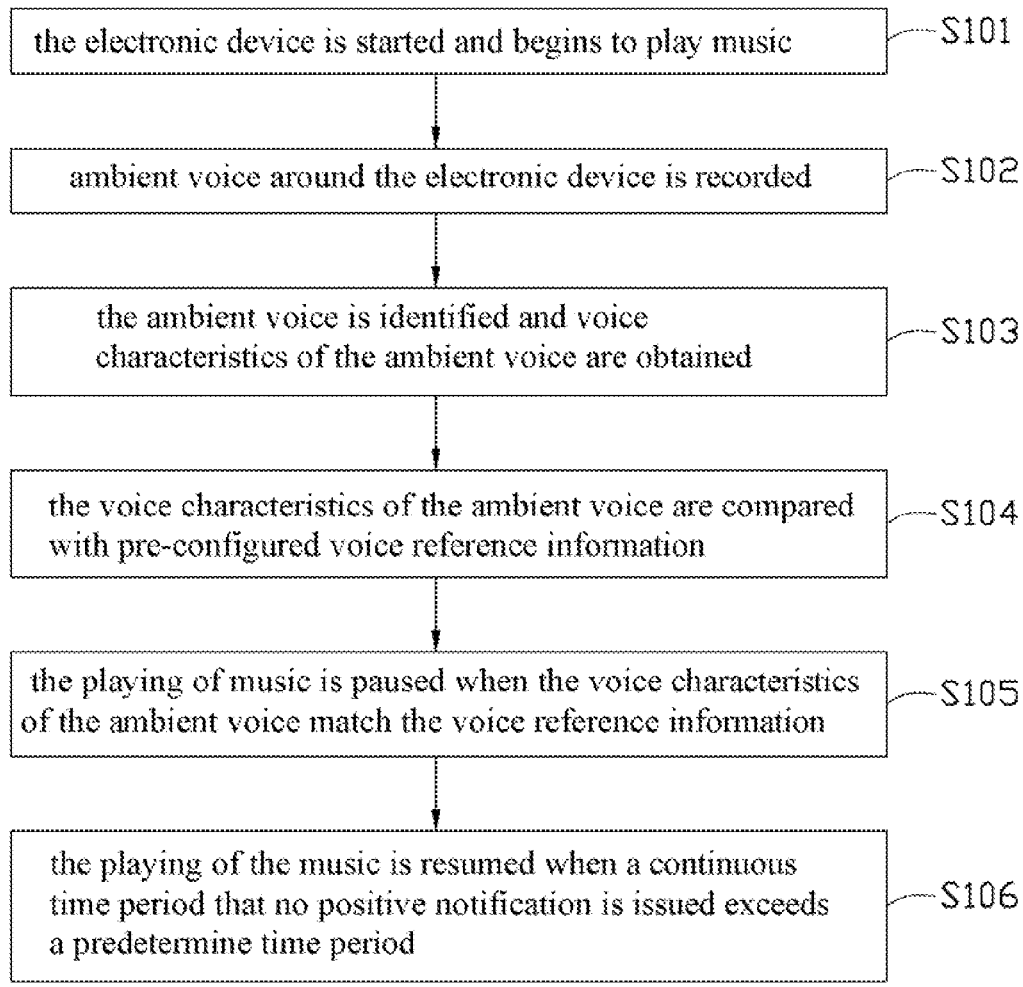
FIG. 2 schematically illustrates a flowchart of a method for controlling music playing in the electronic device of FIG. 1.

Referring also FIG. 2, the present disclosure further provides a method for controlling the playing of music in an electronic device. The method can be implemented in the electronic device 10 as illustrated in FIG. 1. The method includes the following steps.

Step S101, the electronic device 10 is started and begins to play music.

The music play module 103 of the electronic device 10 may be activated by the user to start playing music.

Step S102, ambient voice around the electronic device 10 is recorded.

The electronic device 10 may use the voice recorder 104 to record ambient voice around the electronic device 10, and the ambient voice recorded by the voice recorder 104 may be transmitted to the voice identification unit 110 of the music control module 100.

Step S103, the ambient voice is identified and voice characteristics of the ambient voice are obtained.

For example, the voice identification unit 110 performs a voice identification process on the ambient voice recorded by the voice recorder 104, the voice identification process may include signal filtering, noise reduction, signal amplifying, voice spectrum obtainment and analysis. Accordingly, voice characteristics of the ambient voice including ambient voice content information and/or ambient voice spectrum can be obtained by the voice identification unit 110.

Step S104, the voice characteristics of the ambient voice are compared with pre-configured voice reference information.

For example, the voice reference information may be pre-configured in the voice analyzer 120, and includes voice information of preset keywords such as user's name or nickname, and/or, a voice spectrum of the user. After the voice identification unit 110 obtains the voice characteristics of the ambient voice, the voice analyzer 120 may compare the voice characteristics of the ambient voice with the pre-configured voice reference information to determine whether the voice characteristics of the ambient voice match the pre-configured voice reference information.

In one embodment, if the ambient voice content information matches the voice reference of a preset keyword, or if the ambient voice spectrum matches the voice spectrum of the user, the voice analyzer 120 may determine that the voice characteristics of the ambient voice match the pre-configured voice reference information, and correspondingly issue a positive notification. If neither the ambient voice content information nor the ambient voice spectrum matches the pre-configured voice reference information, the voice analyzer 120 may determine that the voice characteristics of the ambient voice do not match the pre-configured voice reference information, and correspondingly issue a negative notification.

In an alternative embodiment, the voice analyzer 120 may determine that the voice characteristics of the ambient voice match the pre-configured voice reference information only if the ambient voice content information matches the voice reference of a preset keyword and the ambient voice spectrum matches the voice spectrum of the user, otherwise, the voice analyzer 120 may determine that no match is found.

Step S105, the playing of music is paused when the voice characteristics of the ambient voice match the voice reference information.

When the control unit 130 receives a positive notification representing that the voice characteristics of the ambient voice match the voice reference information, the control unit 130 may generate and output a control signal to the music play module 103 and thus control the music play module 103 to pause the playing of music. In contrast, when the control unit 130 receives a negative notification representing that the voice characteristics of the ambient voice do not match the voice reference information, the control unit 130 may control the music play module 103 to maintain the playing of music.

Step S106, the playing of music is resumed when a continuous time period that no positive notification is issued exceeds a predetermine time period.

After the music play module 103 pauses the playing of the music, the music control module 100 may use the timing unit 140 to determine a continuous time period that no positive notification is issued from the voice analyzer 120. If the continuous time period exceeds a predetermine time period (e.g., 30 seconds or 1 minute), the timing unit 140 may provide a time-out signal to the control unit 130, and thereby trigger the control unit 130 to control the music play module 130 to resume the playing of the music.

With the above configuration and method, if a person orally calls a user who is enjoying music played by the electronic device 10 (e.g., the user is wearing headphones), the music control module 100 determine whether the ambient voice content information matches the voice reference of a preset keyword, and automatically control the music play module 103 to pause the playing of the music, so that the user can be aware of a person talking. Moreover, when the user is trying to talk to others, the music control module can match the ambient voice spectrum with the voice spectrum of the user, and automatically control the music play module 103 to pause the playing of the music. Furthermore, by using the timing unit 140 in the music play module 103, the electronic device 10 can resume playing the music automatically when the conversation has ended. Therefore, the electronic device 10 brings convenience to the user.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of shape, size and arrangement of parts within the principles of the present disclosure to the full extent indicated by the broad general meaning of the terms in which the appended claims are expressed.

What is claimed is:

1. An electronic device, comprising:
a non-transitory storage medium;
a processor;
a music play module configured for playing music;
a voice recorder configured for recording ambient voice around the electronic device; and
a music control module comprising one or more software program stored in the non-transitory storage medium and implemented by the processor to identify voice characteristics of the ambient voice, and to control the music play module to pause playing of the music when the voice characteristics of the ambient voice match pre-configured voice reference information.

2. The electronic device of claim 1, wherein the voice characteristics comprise at least one of ambient voice content information and ambient voice spectrum.

3. The electronic device of claim 2, wherein the pre-configured voice reference information comprises voice information of preset keywords, and/or a voice spectrum.

4. The electronic device of claim 3, wherein the music control module comprises a voice analyzer configured for determining whether the voice characteristics of the ambient voice match the pre-configured voice reference information, and issuing a positive notification when the ambient voice content information matches the voice reference of a preset keyword, and/or the ambient voice spectrum matches the voice spectrum.

5. The electronic device of claim 4, wherein the music control module further comprises a control unit configured for controlling the music play module to pause the playing of the music when the control unit receives the positive notification.

6. The electronic device of claim 5, wherein the music control module comprises a timing unit configured for providing, after the music play module pauses the playing of the music, a time-out signal to the control unit to enable the control unit to control the music play module to resume the playing of the music when a continuous time period that no positive notification is issued from the voice analyzer exceeds a predetermined time period.

7. A method for controlling music playing of an electronic device, comprising:
 recording, by a voice recorder of the electronic device, ambient voice around the electronic device;
 identifying, by a processor of the electronic device, voice characteristics of the ambient voice;
 determining, by the processor, whether voice characteristics of the ambient voice match pre-configured voice reference information; and
 pausing, by the processor, music being played by the electronic device when the voice characteristics of the ambient voice match the pre-configured voice reference information.

8. The method of claim 7, wherein the identifying voice characteristics of the ambient voice comprises:
 performing, by the processor, voice identification process on the ambient voice; and
 obtaining, by the processor, voice characteristics of the ambient voice including ambient voice content information and/or ambient voice spectrum.

9. The method of claim 8, wherein the pre-configured voice reference information comprises voice information of preset keywords, and/or a voice spectrum.

10. The method of claim 9, wherein the determining whether voice characteristics of the ambient voice match pre-configured voice reference information comprises:
 comparing the voice characteristics of the ambient voice with the pre-configured voice reference information; and
 determining that the voice characteristics of the ambient voice match the pre-configured voice reference information when the ambient voice content information matches the voice reference of a preset keyword or the ambient voice spectrum matches the voice spectrum.

11. The method of claim 7, further comprising:
 issuing, by the processor, a positive notification when it is determined that the voice characteristics of the ambient voice match the pre-configured voice reference information; and
 issuing, by the processor, a negative notification when it is determined that the voice characteristics of the ambient voice do not match the pre-configured voice reference information.

12. The method of claim 11, wherein the pausing, by the processor, music being played by the electronic device when the voice characteristics of the ambient voice match the pre-configured voice reference information comprises:
 receiving the positive notification representing that the voice characteristics of the ambient voice match the pre-configured voice reference information; and
 generating, in responsive to the positive notification, a control signal and using the control signal to control a music play module to pause the playing of the music.

13. The method of claim 12, further comprising:
 determining, by the processor, a continuous time period that no positive notification is issued after the playing of the music in the electronic device is paused; and
 resuming, by the processor, the playing of the music in the electronic device when the continuous time period exceeds a predetermined time period.

* * * * *